United States Patent [19]

Moyer et al.

[11] Patent Number: 5,198,007
[45] Date of Patent: Mar. 30, 1993

[54] FILTER INCLUDING A POROUS DISCRIMINATING LAYER ON A FUSED SINGLE CRYSTAL ACICULAR CERAMIC SUPPORT, AND METHOD FOR MAKING THE SAME

[75] Inventors: John R. Moyer; Neal N. Hughes, both of Midland, Mich.

[73] Assignee: The Dow Chemical Company, Midland, Mich.

[21] Appl. No.: 803,292

[22] Filed: Dec. 5, 1991

[51] Int. Cl.$^5$ ............................................... B01D 39/20
[52] U.S. Cl. ................................. 55/523; 55/DIG. 5; 55/DIG. 30; 210/510.1
[58] Field of Search ........ 210/510.1; 55/523, DIG. 5, 55/DIG. 3; 156/89; 428/116–118; 501/53, 55, 80, 68, 94, 133, 153, 154

[56] References Cited

U.S. PATENT DOCUMENTS

| | | |
|---|---|---|
| 3,881,944 | 5/1975 | Beall et al. |
| 3,993,499 | 11/1976 | Jacobson et al. |
| 4,278,544 | 7/1981 | Takashima |
| 4,293,357 | 10/1981 | Higuchi et al. |
| 4,335,023 | 6/1982 | Dettling et al. |
| 4,364,761 | 12/1982 | Berg et al. |
| 4,419,108 | 12/1983 | Frost et al. |
| 4,451,517 | 5/1984 | Inoguchi et al. |
| 4,509,966 | 4/1985 | Dimick et al. |
| 4,629,483 | 12/1986 | Stanton |
| 4,632,683 | 12/1986 | Fukutani et al. |
| 4,689,150 | 8/1987 | Abe et al. |
| 4,704,863 | 11/1987 | Abthoff et al. |
| 4,874,516 | 10/1989 | Kondo |
| 4,910,172 | 3/1990 | Talmy et al. |
| 4,911,902 | 3/1990 | Talmy et al. |
| 4,976,760 | 12/1990 | Helferich et al. |
| 5,104,540 | 4/1992 | Day et al. ............ 210/510.1 |

FOREIGN PATENT DOCUMENTS 63103877A 10/1986 Japan.
02081915 3/1990 Japan.

OTHER PUBLICATIONS

B. Locsei, "Contributions to the Kinetics of Mullite Formation in the System Aluminum Fluoride-Silica, I," 33 *Acta Chim. Hung.* 197–210 (1962).

A. M. Abdel Rehim, "Formation of Mullite, Topaz and Corundum," 13 *Thermochimica Acta* 231–39 (1975).

I. I. Nemets et al., "On the Creation Of a Ceramic Material, Self-Reinforced with Needle-like Mullite Crystals," 123 *Mosk. Khim. Tekhnol. Inst. im. D. I. Mendeleeva* 30–33 (1982) (incl. translation).

*Primary Examiner*—Frank Sever

[57] ABSTRACT

A filter useful for separating contaminants from fluids includes a fused single crystal acicular ceramic support having a discriminating layer thereon, such as a sintered, porous alpha-alumina membrane, on at least part of the support. The support is preferably composed of a non-stoichiometric acicular mullite of about 76 percent by weight $Al_2O_3$ and about 24 percent by weight $SiO_2$. The support can be any one of a variety of shapes, but is conveniently elongated in form and preferably includes a plurality of parallel channels through it. The support may be in either a dead-end or cross-flow configuration. In the dead-end configuration, half of the channel holes at each end are plugged in a checkerboard arrangement with the holes open at one end and plugged at the other end. In the cross-flow configuration, all channels are connected by a series of shallow slits cut in the filter, and no end plugs are used.

36 Claims, 2 Drawing Sheets

FILTER INCLUDING A POROUS DISCRIMINATING LAYER ON A FUSED SINGLE CRYSTAL ACICULAR CERAMIC SUPPORT, AND METHOD FOR MAKING THE SAME

TECHNICAL FIELD

This invention relates generally to a ceramic filter for filtering a fluid, either a liquid or a gas.

BACKGROUND OF THE INVENTION

Ceramic filter media are commonly used in a wide range of fluid handling procedures, including filtration, diffusion, recovery, transfer, mixing and foaming. Ceramic filter media are also employed as catalysts themselves, or as carriers for catalysts. Ceramics are well known to possess several advantages as filter media over alternatives such as organic or metallic filter media. One such advantage is that ceramics generally possess superior resistance to deterioration from heat or chemical exposure, in comparison to other media.

Ceramic filter media are most often used in the form of an aggregation of ceramic particles, either loose or bound to one another. The ceramic particles can be formed as spheres, platelets or needles. The particles are routinely obtained by crushing and classifying (that is, sorting by size) a previously manufactured mass of the desired material. This method of manufacture is subject to some drawbacks, however. Crushing of the formed materials can often degrade some of the desirable structural characteristics enjoyed by the material, such as its impact strength, mechanical strength, rigidity, porosity or aspect ratio. With respect to materials such as platelets or needles, a lower aspect ratio indicates either a shorter or a thicker needle. Thinner needles yield filters with smaller pore sizes. Moreover, with materials such as platelets or needles, the separately formed platelets or needles are often very delicate and interwoven when manufactured, and consequently fracture upon attempts to separate and classify them. Even if they can be successfully separated, aggregation of the particles may require sintering or the use of a bonding agent for rigidity, impact strength or mechanical strength. Alternatively, the particles can be aggregated by placing them in a metal container. However, such containers can be expensive, and may not be completely resistant to the gas or liquid being treated.

Ceramic filter media have also been used as supports for discriminating layers such as fluorocarbon polymers or sintered ceramic membranes. These supports have typically been made from previously fired spherical particles of alpha-alumina or cordierite. The particles are then lightly sintered to bond them together and give them mechanical strength. Unfortunately, the resulting supports may not possess all the strength that might be desired, particularly against impact, or against the pressure of the fluid flowing through them. Moreover, the resulting supports have not been very porous, usually only about 30 percent porous (or 70 percent of theoretical density, defined as 100 percent minus the volume percent porosity).

Many solutions have been suggested to these problems. Each entails its own drawbacks, however. For example, published Japanese Patent application JP 63-103877A (Nagasaki Ken, published May 9, 1988) discloses a process for preparing a porous compact useful for industrial filtering, for foam generating, as a bioreactor carrier, or for catalysis. The compact is described as having fine porous structure with a relatively high deflection strength. The compact consists of acicular mullite crystals formed from compression molding and sintering stoichiometric mullite (3 $Al_2O_3.2SiO_2$). The starting material includes additives so as to allow transfer of any unreacted or any excess silica into a glass phase, which is then eluted with an acid.

U.S. Pat. No. 3,993,449 (Howard Jacobson et al., Nov. 23, 1976) discloses a process for preparing single crystal mullite fibrils useful as fillers, catalysts, or catalyst supports. The fibrils are made from aluminum sulfate, a silica source and an alkali metal salt (fluxing agent). The molar ratio of aluminum to silicon in the reactants is from 2.6:2 to 6:2, expressed as $Al_2O_3/SiO_2$, with at least one alkali metal atom for each aluminum atom. The reference states that although a product that is predominantly "true" (3/2 or stoichiometric) mullite can be obtained from reactants throughout that range, it is preferred to maintain the ratio in the range 2.8 to 3.4:2, so as to avoid the quantity of alpha-alumina platelets which are obtained if there is a large excess of alumina in the reactant mixture.

U.S. Pat. No. 3,881,944 (George H. Beall et al., May 6, 1975) discloses a porous glass-ceramic body, for example, of siliceous glass and mullite, from which the glass is leached by hydrofluoric acid. The predominant phase of the body can be a sub-stoichiometric mullite, which may be no more than 25 percent crystalline, with excess $SiO_2$ and a modifying oxide. The highest degree of porosity obtained in the examples after leaching is 56.5 percent.

While each of these three disclosures suggests that a fibrous mullite body or support can be obtained that is relatively strong, it is not clear that the whiskers of the bodies are bound to each other sufficiently to provide the impact and mechanical strength necessary for use of the bodies in a variety of environments. Moreover, control of pore size in such bodies is not as great as could be desired because the average pore sizes are typically quite small. The bodies are thus often not useful for applications requiring higher porosities, for example, from 50 up to 85 percent. The use of hydrogen fluoride to elute the glass phase is itself inconvenient because of the risks involved in handling hydrofluoric acid. Additionally, devices constructed from metal generally cannot be used in processes employing hydrofluoric acid as an elution agent.

It is therefore an object of the present invention to provide a ceramic filter structure with a discriminating layer thereon, where the filtering medium has been grown in situ to form a network of interlocked needles or platelets which has high mechanical strength, high impact strength, heat resistance and good resistance to thermal cycling.

It is a further object of the present invention to provide a support for a ceramic or other filter membrane having high porosity, yet with superior bonding of the material making up the support for the filter.

It is yet another object of the present invention to provide a method for manufacturing such a filter including a ceramic support which does not entail the dangers associated with the prior use of hydrogen fluoride or other acid for eluting a glass phase from the support.

It is a further object of the present invention to provide a method of interlocking two or more pieces into a ceramic support having a uniform composition and structure, including throughout the locations at which the pieces are joined.

It is also an object of the present invention to eliminate the need for elements of disparate composition, and the need for any means to connect such elements, in a ceramic filter structure.

SUMMARY OF THE INVENTION

In accordance with the preferred embodiment of the invention, these and other objects and advantages are addressed as follows.

In a first aspect, the present invention is a filter useful for separating at least one contaminant from a fluid passed through the filter, which comprises a porous support composed of a fused interlocked single crystal acicular ceramic with a porous discriminating layer, such as a sintered porous alpha-alumina membrane. The layer is on at least part of the support, such as one side of the support. The support preferably comprises a great plurality of fused and interlaced whiskers of single crystal non-stoichiometric mullite having the approximate formula $2Al_2O_3.SiO_2$.

In a related aspect, the support is composed of a non-stoichiometric acicular mullite of 76 percent by weight alumina and 24 percent by weight silica. In another related aspect, the support is formed as a honeycomb extrusion of plural parallel channels, and the filter further comprises plugs of porous, non-stoichiometric, acicular mullite interlocked with the support, disposed in single, alternating ends of the tubes. In yet another related aspect, the support is about 50 to about 85 percent porous.

In a second aspect, the present invention is directed to a filter useful for separating at least one contaminant from a fluid passed through the filter, and first comprises a support including: a porous honeycomb extrusion composed of a non-stoichiometric acicular mullite, having a plurality of parallel channels and including a fluid inlet end and a fluid outlet end; a plurality of plugs closing single alternating ends of the channels, composed of non-stoichiometric acicular mullite interlocked with the support; and end caps positioned over the fluid inlet and fluid outlet ends of the extrusion, also composed of non-stoichiometric acicular mullite interlocked with the extrusion. The filter also comprises an external fluid impermeable glaze substantially covering the support. The extrusion, the plugs and one of the end caps include surfaces defining an inlet chamber in the filter, and a sintered, porous alpha-alumina membrane is positioned on the chamber-defining surfaces to act as a discriminating layer for filtering and separating.

In a third aspect, the present invention is directed to a method of forming a filter useful for separating at least one contaminant from a fluid passed through the filter, comprising the steps of: forming a green support composed of a ceramic material capable of being converted in situ into fused, interlocked, single crystal, acicular ceramic particles; converting said ceramic material in situ into such particles, thereby forming a rigid and porous ceramic support; and applying a discriminating layer on at least part of the support.

In a related aspect, the layer is formed by coating at least one surface of the support with a slurry of alpha-alumina, and sintering the support and the alpha-alumina so as to form a thin, continuous membrane of porous alpha-alumina on the surface of the support. In another related aspect, the support is formed by abutting together at least two support pieces (such as a honeycomb extrusion and a porous plug or end cap) each composed of a non-stoichiometric mixture of alumina and silica, in which the pieces become interlocked when converted to acicular mullite.

In a fourth aspect, the present invention is directed to a method of forming a filter useful for separating at least one contaminant from a fluid passed through the filter, the filter including a porous ceramic support, comprising the steps of: abutting at least two support pieces together, each of the pieces being composed of a ceramic material capable of being converted in situ into fused, interlocked single crystal whiskers; and converting the two abutted support pieces in situ into fused, interlocked single crystal whiskers; whereby the two support pieces become unified and interlocked by the whiskers so formed.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE INVENTION

Figure 1:
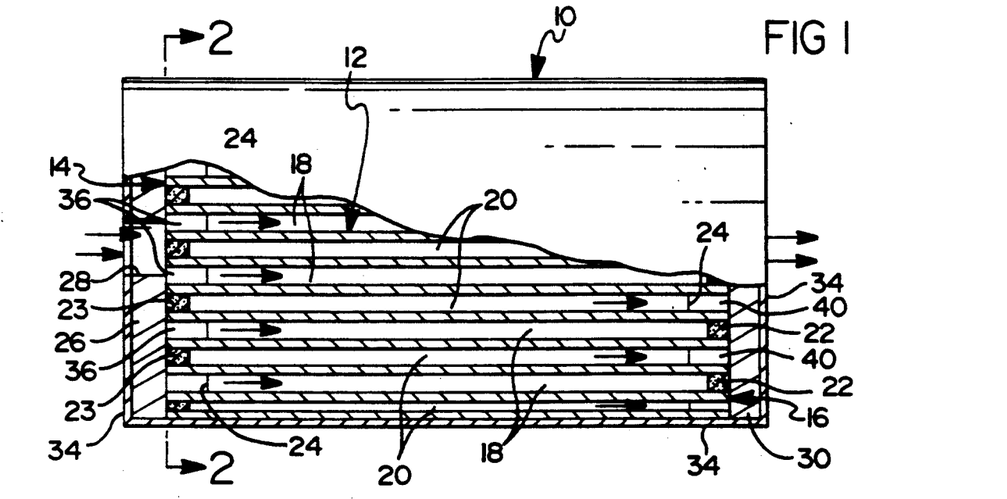
FIG. 1 is a partial cut away side view of a filter constructed in accordance with the present invention.

Referring first to FIG. 1, a filter 10 is thereshown useful for removing an entrained contaminant from a fluid, for example, for removing insoluble organic material from an aqueous slurry. The filter 10 first comprises a support 11 composed of a fused single crystal acicular ceramic of interlocked needles, whiskers or platelets (collectively, "whiskers" or "acicular particles"). The support 11 is distinguished from prior supports in that the ceramic of which it is composed includes individual acicular particles which are not merely interwoven as in prior supports, but which are instead constituted as single crystals which are rigidly interlocked at the locations where they cross, by fusion during their formation process. As described in more detail below, the conversion of the ceramic into fused and interlocked acicular particles occurs in situ, and it is the fusion and interlocking of the whiskers which yields a support possessing significantly improved structural strength and resistance to high temperatures, in contrast to prior supports constructed from previously formed whiskers which have been separated, classified and lightly resintered, with or without a binding agent.

It is preferred that the ceramic material of which the support 11 is composed be a non-stoichiometric acicular mullite composed of about 76 percent by weight alumina and 24 percent by weight silica. However, other equivalent materials which also are capable of forming fused, interlocking, single crystal, acicular structures upon in situ formation are useful in the present invention, so long as the acicular particles so formed simultaneously interlock and fuse during formation. Equivalent materials are believed to include aluminum borate whiskers, alumina whiskers and alpha-alumina platelets, or other materials sharing these characteristics.

The support 11 can be formed in any of a variety of conventional shapes, including a disk, a barrel, a tube, a dead-end body, a cross-flow body, or the like The support 11 of the present invention can also be formed in more complex fashions than permitted by prior methods of forming filter supports. The support 11 of the present invention can be composed as either a single piece, or as a plurality of pieces having a uniform composition and structure, especially through the locations at which the pieces are joined to each other.

Of course, the shape of the support 11 should be selected as appropriate to the filtering function desired. For example, the support 11 can be configured as a honeycomb extrusion for either a dead-end or cross-flow filter. In the dead-end configuration, half of the holes at each end of the honeycomb are plugged in a checkerboard arrangement with the holes open at one end and plugged at the other end. In the cross-flow configuration, all of the channels making up the honeycomb are connected by a series of shallow slits in the support, and no end plugs are used. A honeycomb support shape is shown in copending application Ser. No. 07/633,580, filed Dec. 21, 1990, and assigned to the assignee of the present invention. That application is incorporated by reference herein.

Thus, in the filter 10 shown in FIG. 1, the support first comprises a honeycomb extrusion 12 having a fluid inlet end 14 and a fluid outlet end 16. A plurality of longitudinally extending inlet channels 18 and parallel longitudinally extending outlet channels 20 extend from the fluid inlet end 14 and to the fluid outlet end 16 of the honeycomb 12. The inlet channels 18 are formed by plugging their downstream ends adjacent the outlet end 16 with downstream plugs 22, while the outlet channels 20 are formed by plugging their upstream ends adjacent the inlet end 14 with upstream plugs 23.

Figure 2:
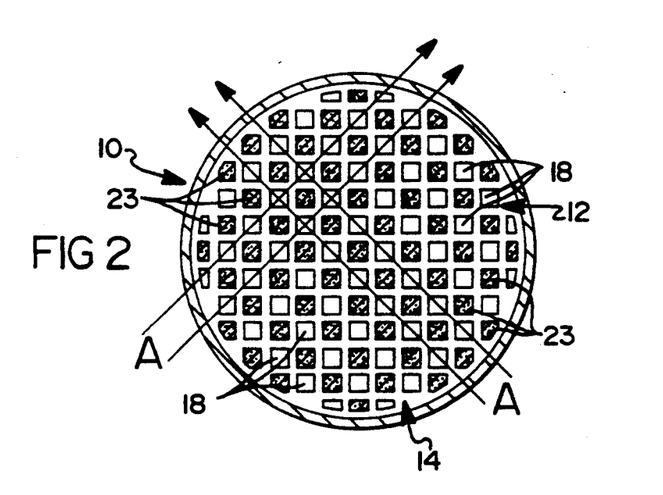
FIG. 2 is a cross-sectional view taken along line 2—2 of FIG. 1.

As more clearly shown in FIG. 2, the inlet channels 18 and the outlet channels 20 are conveniently arranged in alternating, checkerboard fashion. At their open ends, all of the inlet channels 18 and all of the outlet channels 20 are placed in fluid communication by saw cuts 24 extending across the honeycomb extrusion 12 in the direction of arrows A on both the fluid inlet end 14 and the fluid outlet end 16 of the honeycomb extrusion 12.

The support 11 also comprises an inlet end cap 26 attached to the inlet end 14 of the honeycomb extrusion 12. The inlet end cap 26 has a hole 28 formed through it, in fluid communication with the inlet channels 18 through the spaces provided by the saw cuts 24. The surfaces of the downstream plugs 22 and the inlet channels 18, together with the interior surface of the inlet end cap 26, define an inlet chamber 36 within the filter 10.

An outlet end cap 30 is preferably affixed to the outlet end 16 of the honeycomb extrusion 12. The outlet end cap 30 includes a hole 32 (shown in FIG. 3) formed in it, in fluid communication with the outlet channels 20 through spaces provided by the saw cuts 24. The exterior of the honeycomb extrusion 12 and the inlet and outlet end caps 26 and 30 are substantially covered with a fired glaze layer 34 (except for the inlet and outlet holes 28 and 32), impermeable to the fluid to be treated and nonreactive to the fluid and its entrained contaminants.

In addition to these elements, the filter 10 also comprises a porous discriminating layer 38 on at least part of the support 11, for example, on the surfaces of the downstream plugs 22, the inlet channels 18, and the interior surface of the inlet end cap 26 which define the inlet chamber 36. The discriminating layer 38 is preferably a sintered alpha-alumina membrane, but can be any conventional layer suitable for filtration, microfiltration, ultrafiltration (for example, sterilization, purification of crystals, or the like), reverse osmosis (for example, desalination of sea water), or gas separation.

Classes of materials useful for the discriminating layer 38 include sintered ceramics (of which the alpha-alumina membrane is an example), polymeric organic compounds, molecular sieves, gels, and microporous or ultraporous gaseous diffusion barriers. "Molecular sieves" include both the zeolites and the crystalline aluminophosphates derived from mixtures containing an organic amine or a quaternary ammonium salt. "Gels" are simply those gels (such as dextran gels) which are useful in gel filtration. "Polymeric organic compounds" include hydrocarbon, halogenated hydrocarbon, fluorocarbon, and chlorofluorocarbon resins and polymers, such as polytetrafluoroethylene (PTFE), tetrafluoroethylene/hexafluoropropylene copolymer (FEP), tetrafluoroethylene/perchloroalkylvinylether copolymer (PFA), polychlorotrifluoroethylene (PCTFE), polyvinyldifluoride (PVDF), polypropylene resin, and polyvinylchloride resin.

These classes and example of materials useful for the discriminating layer 38 are merely exemplary and should not be taken as limiting the scope of the present invention. Rather, they illustrate the variety of materials which can provide pore sizes within the useful range of about 0.5 nanometers to about 50 micrometers. (This is not to suggest that any of these materials will by itself provide pore sizes throughout this entire range.) The particular material for the discriminating layer 38 should be compatible with the material of the support 11 and must of course be selected in view of the desired function of the discriminating layer 38.

Figure 3:
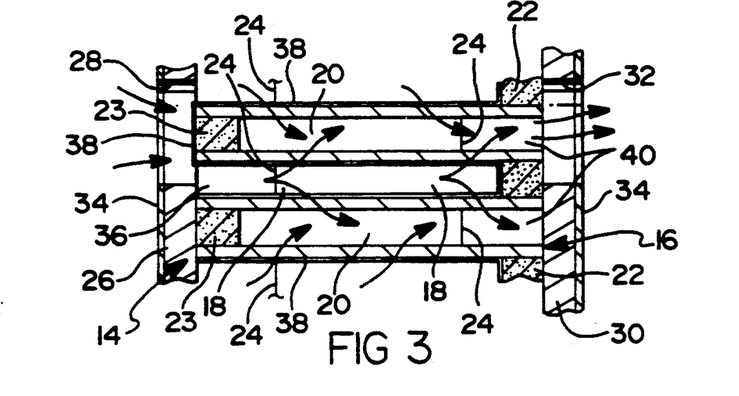
FIG. 3 is a partial cross-sectional view similar to FIG. 1, more clearly showing the flow of fluid therethrough and the alpha-alumina or other membrane coating part of the interior of the filter.

In the use of the filter 10 of the present invention, as indicated by the unlabeled arrows in FIG. 3, fluid entering the filter 10 through the inlet hole 28 passes via the inlet chamber 36 through the discriminating layer 38 and through the walls of the honeycomb extrusion 12, into the outlet channels 20. The surfaces of the outlet channels 20 and the upstream plugs 23, together with the interior surface of the outlet end cap 30, define an outlet chamber 40 for collection of the permeate fluid, which exits the filter 10 through the outlet hole 32.

The filter 10 is preferably constructed as follows: a mixture containing alumina ($Al_2O_3$) and silica ($SiO_2$) in a molar ratio of about 2 to 1 (an atomic ratio of aluminum to silicon of about 4 to 1) is first prepared. The mixture can be prepared by combining clay and alumina, having a net composition of about 76 percent by weight alumina and 24 percent by weight silica, the clay and alumina being mixed according to the amount of alumina and silica in the clay. All of the following percentages, unless indicated otherwise, are also by weight. Suitable clays will typically contain about 35 percent silica and about 50 percent alumina, so that a typical starting composition prepared from alumina and clay can include about 60 percent clay and about 40 percent alumina. However, the mixture is advantageously and preferably prepared directly from alumina and fused (amorphous) silica powders of high purity. The mixture of alumina and clay or silica may be blended with a conventional filler for ceramics, such as wood flour or saw dust, and a convenient amount of water for handling. The filler provides porosity to the mixture upon conversion to acicular mullite, for example, by combustion of an organic filler, or by evolution of water from a hydrated form of alumina or silica. The non-stoichiometric mullite will retain its overall dimensions and its theoretical density upon conversion to its acicular form.

The mixture of alumina, filler and either silica or clay is formed into any convenient or desired shape for the support 11. For example, a first portion of the mixture can be extruded in a honeycomb shape to yield the honeycomb extrusion 12. The remainder of the mixture can then be used to form other pieces of the support 11 in a similar fashion.

The theoretical density of the support 11 will vary upon the volume percentage of filler employed in the mixture and the amount of pressure applied during the shape-forming process. Typically, a honeycomb extrusion can be made having sufficient green strength at 40 to 50 percent theoretical density. The inclusion of a greater volume percentage of filler allows other shapes to be obtained having theoretical densities as low as 15 percent, that is, having 85 percent porosity. The shape and theoretical density of the support 11 are selected to match the needs to which the filter 10 will be put, and to match the discriminating layer 38.

Once extruded, the honeycomb extrusion 12 is allowed to dry to a self-sustaining green body. Alternating single holes at opposing ends of the inlet channels 18 and the outlet channels 20 of the extrusion are then plugged in checkerboard fashion with green plugs 22 and 23 made of a paste of the same composition as the honeycomb extrusion 12, that is, of a composition having the same net proportion of aluminum to silicon. When green, the plugs 22 and 23 may possess the same amount of filler as the composition making up the extrusion 12. However, it is preferred for handling purposes that the green plugs 22 and 23 have a higher porosity than the extrusion 12, for example, typically on the order of 70 percent (30 percent theoretical density). This higher porosity is achieved by mixing more filler or water with the mixture of alumina and either clay or silica.

After the plugs 22 and 23 have dried to a green stage, the open ends of all of the inlet channels 18 and all of the outlet channels 20 are placed in fluid communication by the cutting of the saw cuts 24 across the whole of the open channel ends, in the diagonal directions shown by arrows A in FIG. 2. The end caps 26 and 30 are then fastened to the ends 14 and 16 of the honeycomb extrusion 12 either by moistening the end caps 26 and 30 with water, or by applying to the end caps 26 and 30 a diluted slurry of the paste used for the plugs 22 and 23. The end caps 26 and 30 are also fashioned from the same composition as the honeycomb extrusion 12, that is, having the same ratio of aluminum to silicon as in the extrusion 12.

The honeycomb extrusion 12, the plugs 22 and 23, and the end caps 26 and 30 are then oriented vertically and all converted to acicular, non-stoichiometric mullite. Preferably, the conversion is carried out in such a fashion so that the extrusion 12, plugs 22 and 23, and end caps 26 and 30 retain the same theoretical density or porosity as they possessed in their green state. It is particularly preferred, however, that the conversion process be carried out in accordance with the process disclosed in our copending application Ser. No. 07/633,579, filed Dec. 21, 1990, and assigned to the assignee of the present application. That application is expressly incorporated by reference herein.

In general, the preferred conversion process is a two step process in which alumina and silica in a molar ratio of about 2 to 1 are heated in a closed system at 500° to 950° C. in the presence of $SiF_4$. The alumina, silica and $SiF_4$ are heated a sufficient time to react and form fluorotopaz. The resulting fluorotopaz is then heated to about 1100° to 1150° C. The fluorotopaz transforms to non-stoichiometric mullite whiskers, with the evolution of all of the $SiF_4$ previously absorbed. If necessary, the temperature can be cycled between these two ranges until $SiF_4$ is no longer absorbed by the material upon cooling down to the lower temperature range, indicating that no unreacted alumina and silica remains in the mixture. Unexpectedly, not only does this process convert the honeycomb extrusion 12, the plugs 22 and 23 and the end caps 26 and 30 to non-stoichiometric acicular mullite, the whiskers forming them fuse and become interlocked in a three dimensional fashion, so as to fix the plugs 22 and 23 and the end caps 26 and 30 steadfastly to the honeycomb extrusion 12. The resulting support 11 is thus composed of a plurality of pieces which are extremely resistant to separation, since they are structurally uniform with and interlocked with each other, even through the locations at which the pieces abut.

Once converted to acicular mullite, the exterior of the honeycomb extrusion 12 and the end caps 26 and 30 are preferably coated with any conventional, compatible glaze, and fired. The glaze forms a nonreactive, fluid-impermeable surface over the extrusion 12 and the end caps 26 and 30. The preferred glaze is a mixture of glass frit and clay. One particularly preferred high temperature, commercial glaze for this purpose is sold under the trademark "PEMCO" glaze by Mobay Chemical Company. Of course, depending upon the service temperature intended for the filter 10, the exterior of the honeycomb 12 and the end caps 26 and 30 can be rendered impermeable by any one of a number of other conventional techniques.

The alpha-alumina membrane or other discriminating layer 38 is then applied to the surfaces defining the plurality of inlet chambers 36 of the filter 10. The layer 38 can be applied in any fashion conventional for the application of discriminating layers. Essentially any conventional coating is useful as the layer 38, so long as it possesses a pore size less than the pore size of the honeycomb extrusion 12. Many hydrocarbon polymers, fluorocarbon polymers and ceramics are known to be useful in this regard. It is particularly preferred, however, that alpha-alumina be used for this purpose. For example, when an alpha-alumina membrane is used in the present invention to separate insoluble organics from an aqueous slurry, the organics trapped on the membrane can advantageously be ignited and burned from it, thereby regenerating the filter 10.

The discriminating layer to be applied onto the support may include a sintered ceramic layer, such as an alpha-alumina membrane having a pore size of between about 0.15 and 50 micrometers, useful for a microfilter. If an ultrafilter is desired, smaller pore sizes may be made as described hereinbelow. Such an alpha-alumina discriminating membrane may be applied to the surfaces defining the inlet chambers 36 as follows. A slurry of the alpha-alumina in water is first prepared, typically containing 50 percent or more water. As is conventional, the slurry can also include a dispersant in order to prevent agglomeration of the alpha-alumina powder in the slurry. The slurry can include an acid or base in order to adjust the pH of the slurry and improve dispersion of the alpha-alumina in the slurry. The slurry can also include an agent for controlling the viscosity of the slurry, such as "METHOCEL" (a registered trademark of Dow Chemical Company, Midland, Mich., for its brand of methylcellulose).

The powdered alpha-alumina used for preparation of the membrane is preferably of a high grade of purity, since impurities in the powder will affect the range of sizes and uniformity of sizes of the pores achieved in the membrane. Alcoa Aluminum Corporation and Vista Corporation each sell alpha-alumina powders of near 100 percent purity useful in the present invention. Typical useful grades of Alcoa alpha-alumina are grades A-13, A-16, and A-99. Alcoa grade A-99 powders range in size from about 0.15 to about 1.0 micrometers in diameter, with an average diameter of 0.2 micrometers. Grade A-16 ranges from about 0.2 to about 10 micrometers in size, with an average diameter of about 0.4 micrometers. Grade A-13 ranges in size from about 1 to about 50 micrometers, with a mean diameter between 5 and 10 micrometers. Mixtures of various particle sizes can also be employed in the present invention, to yield any desired pore size in the ceramic membrane.

Once the slurry is prepared, it is introduced into the inlet chamber 36 through the inlet hole 28 in the inlet end cap 26, and allowed to coat the surfaces of the inlet channels 18, the downstream plugs 22, and the interior surface of the inlet end cap 26. Excess slurry is then removed from the filter 10, and the filter 10 then sintered in order to form a thin, continuous layer of microporous alpha-alumina atop the non-stoichiometric acicular mullite support 11.

In the event that an ultrafilter is desired, a similar procedure is followed, although a slurry of finer particles is used. This will result in a pore size of somewhat greater than about 0.5 nanometers. The discriminating layer may also be graded from the highly porous support through an intermediate discriminating layer of microporous material and topped with a layer of ultrafine porous material, in order to effect more efficient ultrafiltration.

The firing schedules and optimal temperatures for conversion of the non-stoichiometric mixture of alumina and silica or clay to acicular mullite are subject to ready determination without undue experimentation. However, for the preferred mullite, alpha-alumina and glaze compositions disclosed, the following heating schedule is convenient:

1. Filler burn-out and bisque firing. A bisque composed of the assembled green honeycomb extrusion 12, plugs 22 and 23, and end caps 26 and 30 is heated at 3° C. per minute from room temperature up to 350° C., then at 5° C. per minute up to 650° C., and held at that temperature for 60 minutes. The assembly is then heated to 1100° C. at 5° C. per minute, and finally allowed to cool to room temperature at 20° C. per minute.

2. Conversion to acicular mullite. The assembled pieces are reheated in nitrogen at a rate of 10° C. per minute from room temperature up to 950° C., preferably up to about 750° C. The pieces are then subjected to vacuum, and exposed to a $SiF_4$ atmosphere over a period of 60 minutes. The assembly is then heated at 20° C. per minute up to 1100° C., and held at 1100° C. for 60 minutes while $SiF_4$ is removed, for example, by sublimation into another furnace at 750° C. As indicated earlier, the assembly may be allowed to cycle between these two temperatures until conversion is completed, as indicated by a lack of uptake of $SiF_4$ at the lower temperature. The excess $SiF_4$ is desirably removed. Nitrogen is then admitted, and the assembly allowed to cool to room temperature at 25° C. per minute.

3. Creation of external glaze. Glazing is carried out by heating the assembly and the applied glaze to 1000° C. at a rate of 10° C. per minute. The assembly is held at 1000° C. for 15 minutes and then cooled to room temperature at the rate of 25° C. per minute.

4. Sintering of alpha-alumina membrane. After application of the alumina slurry to the surfaces defining the inlet chambers 36, the filter 10 is heated at a rate of about 5° C. per minute from room temperature to 1550° C. The filter 10 is then held at 1550° C. for about 2 hours, and allowed to cool to room temperature at 10° C. per minute.

Again, since the characteristics of the non-stoichiometric acicular mullite ultimately obtained as a support for the discriminating layer 38 depend upon the conditions under which formation of the intermediate fluorotopaz and its decomposition are carried out, the process steps should be optimized for the particular characteristics desired. However, since the formation and decomposition of the intermediate fluorotopaz are carried out as separate steps, it is a significant advantage of the present invention that these can be optimized independently.

The present invention possesses numerous other advantages. Suitable characteristics for the acicular mullite or other fused interlocked single crystal acicular ceramic support can be chosen as appropriate for the membrane to be supported. For example, the individual whiskers making up the acicular non-stoichiometric mullite will typically have diameters ranging from 0.05 to 2 micrometers, aspect ratios of about 10 to about 50, and lengths of 4 to 30 micrometers. However, one advantage of the preferred process for carrying out the conversion as disclosed in our earlier application is that significantly larger whiskers can be obtained, having diameters ranging up to 30 to 50 micrometers, with similar aspect ratios. The interlocked whiskers are bound to each other where they cross, so that a very strong three-dimensional network of very high porosity is achieved over a wide range of support pore sizes. While there has been some prior use of acicular particles as catalysts or catalytic supports, the prior acicular particles were substantially smaller needles than those achieved in this process, and thus provided a significantly smaller pore size than that enjoyed by the support in the present invention.

The present invention enjoys other types of advantages over the prior art. For example, one drawback in the use of conventional polymers on conventional alumina or cordierite supports has been that the polymers and supports tend to flatten under pressure during use, and become less permeable over time. A loss of permeability is evidenced by a decrease in the flow rate through the filter over time, and suggests that the pores close over time. The superior mechanical strength, impact strength and thermal resistivity of non-stoichiometric acicular mullite or another fused single crystal acicular ceramic as a support obviates these problems, and allows membranes to retain high permeability over a long period of use at elevated service temperatures. Because the whiskers are bound together where they cross (unlike prior fiber mats, felts or meshes), the network of mullite whiskers of the present invention does not collapse with time.

Yet another drawback of the prior art filters was that their filter support materials were relatively impermeable when compared to the membrane layers on them. Therefore, because the prior art filter supports were so dense compared to their discriminating layers, the filter supports themselves were the rate-limiting factor for filtration through them. The ceramic filter supports of the prior art devices were typically on the order of about 70% dense (i.e. 30% porous), making the permeable of the supports quite low. In contrast, the filter support of the present invention enjoys a high permeability, due to the theoretical density of from about 15 to about 50 percent. Moreover, because the discriminating layer on top of the filter support of the present invention is denser than the support, the rate-limiting factor is the discriminating layer, rather than the filter support. Thus, due to the high porosity of the present invention (in accordance with the low density), a better filter is achieved for certain applications.

Perhaps the most significant advantage enjoyed by the present invention, however, is the very economical manner in which ceramic filter supports of a variety of complex shapes can be assembled. Prior methods for assembling ceramic filters have generally required some sort of subsequent sintering or bonding step after the ceramic support has been put into acicular form, in order to lend mechanical and impact strength to the filter incorporating it. Because the present invention entails the in situ conversion of a green non-stoichiometric mullite or other ceramic material into a fused single crystal acicular form, the previously required bonding step is eliminated. This in situ conversion also permits complex or multi-piece support shapes to be fully constructed in a green state, rather than from separately fired pieces as previously required, because of the interlocking and fusing of the ceramic single crystals. The invention thus avoids the costs and risks encountered in prior methods involving the affixment together of pre-fired ceramic pieces, such as the time and cost of joining and refiring the pieces, the risk of breaking one or more of the pieces during such manipulations, and the risk of fracture or separation of the refired pieces from inadequate bonding of the pieces to the material filling the joints between them.

Many modifications to the disclosed filter 10 can be made while retaining the advantages enjoyed by the use of a non-stoichiometric acicular mullite or other fused single crystal acicular ceramic as a membrane support. The support need not be a honeycomb extrusion, but can be any conventional or useful shape, depending upon the environment of filtration or material treatment.

Figure 4:
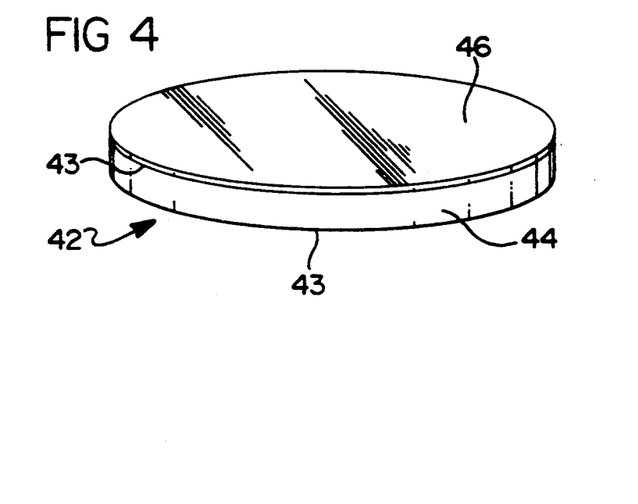
FIG. 4 is a perspective view of another filter constructed in accordance with the present invention.

For example, another preferred form for a filter in accordance with the present invention is the disk filter 42 shown in FIG. 4. The disk filter 42 first comprises a porous support 44 shaped as a circular disk having an opposed pair of flat faces 43. The support 44 is composed of a fused interlocked single crystal acicular ceramic material, preferably of any of the same materials as the support 11 described above.

The disk filter 42 further comprises a porous discriminating layer 46 on one of the faces 43 of the support 44. The discriminating layer 46 can be composed of any of the materials useful for the discriminating layer 38 described above. The discriminating layer 46 defines the upstream or inlet surface of the disk filter 42, but use of the disk filter 42 will typically require that fluid flow into or out of the disk filter 42 be directed by additional elements not shown. These elements can be those typically employed with disk filters of conventional type, such as an external casing (of either the same material as the support 44, or a different material) in which the disk filter 42 is disposed, or a vacuum funnel on which the disk filter 42 is carried, or other devices as are well-known in the art.

Figure 5:
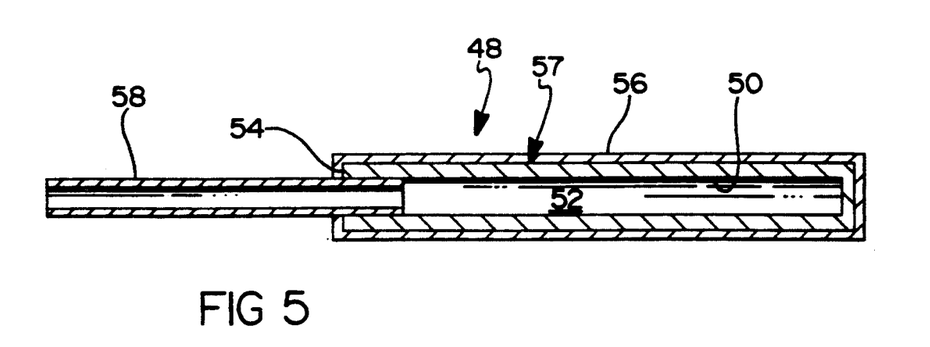
FIG. 5 is a cross-sectional view of yet another filter constructed in accordance with the present invention.

Yet another preferred form for a filter in accordance with the present invention is the cylindrical filter 48 shown in FIG. 5. The filter 48 first comprises a porous support 50 shaped as a hollow, circularly cylindrical tube having an open end 54. The support 50 may alternatively be shaped as a hollow tube with a non-circular cross-section, or may have a solid cross-section, rather than being hollow. Whatever its physical configuration, however, the cylindrical support 50 is composed of a fused interlocked single crystal acicular ceramic material, preferably of any of the same materials as the support 11 described above.

The filter 48 further comprises a porous discriminating layer 56 on at least one of the surfaces of the support 50, for example, on the external surface 57 of the support 50. The discriminating layer 56 can be composed of any of the materials useful for the discriminating layer 38 described above. Fluid to be filtered or otherwise treated by passage through the filter 48 thus flows through the discriminating layer 56 and the cylindrical support 50, and collects in the hollow interior 52 of the support 50.

The filter 48 includes a means for permitting fluid which has collected in the interior 52 of the support 50 to exit the interior 52. Preferably this means is a fluid impermeable connecting tube 58 disposed in the open end 54 of the support 50. The connecting tube 58 is sealed to the support 50 and the discriminating layer 56 so that the fluid which has collected in the interior 52 of the support 50 exits the support 50 through the connecting tube 58. The way in which the connecting tube 58 is attached to the support 50 and the layer 56 is not believed to be critical, so long as the tube 58 does not separate from them, and an adequate seal to them is maintained during use of the filter 48. Nor is the specific composition of the connecting tube 58 believed to be critical, so long as it is impermeable to the fluid being filtered. If composed of an appropriate material, the connecting tube 58 may lend structural support or impact strength to the support 50. Preferably, however, the connecting tube 58 can be constructed of the same material as the support 50 and fused to it in the fashion disclosed above, so long as an impermeable coating (for example, such as the glaze layer 34 described above) is placed atop it.

As indicated above, the three supports 11, 44 and 50 disclosed herein are only a few examples of the variety of shapes a support according to the present invention can take. The support can be formed by any fabrication process and any mixture of constituents which upon in situ conversion yields the preferred non-stoichiometric acicular mullite having a molar ratio of alumina to silica of about 2 to 1, or which yields a ceramic support having structural characteristics comparable to a fused, interlocked, single crystal acicular ceramic material. For example, for converting non-stoichiometric mullite to acicular form, the source of fluorine can be different from $SiF_4$, and materials such as $AlF_3$, $HF$, $Na_2SiF_6$, NaF, and $NH_4F$ are also expected to be useful for this purpose. Examples of prior uses of some of these sources of fluorine are disclosed in Derwent Publication 84-264450/43 ($AlF_3$ and HF); Chemical Abstracts Volume 70, 1969, 9035q, Hanus Landspersky (discussing probable mechanisms of mullite formation with several fluorides); Chemical Abstracts Volume 99, 1983, 99:132640n, Abdel Rehim ($NH_4F$); Chemical Abstracts Volume 70, 1969, 31332j (NaF); Chemical Abstracts Volume 94, 1981, 94:144160r, Sang-Wook Choi et al. ($Na_2SiF_6$); and Derwent Publication 90307R-L ($SbF_3$, $NH_4F$, HF, $Na_2SiF_6$, LiF, $AlF_3$, and $BaF_2.3\frac{1}{2} H_2O$).

The discriminating layer 38 can also be formed by any fabrication process and any constituents which yield a layer useful for its intended purpose. For example, U.S. Pat. No. 4,874,516 discloses a method for applying a PTFE membrane filter to a ceramic substrate so as to permeate the surface layer of the substrate. The substrate and PTFE are heat-treated to yield a supported membrane of a high polymer resinous material having a useful pore size as small as about 0.1 micrometer, for ultra- or semiultrafiltration. Appropriate fabrication processes for membranes or other materials are well known, and can be adapted for use in the present invention without undue experimentation.

Thus, in accordance with the present invention there is provided a filter and a method for making a filter which achieve numerous advantages because of the high permeability, high mechanical and impact strength, and high thermal resistivity enjoyed by non-stoichiometric acicular mullite and other fused single crystal acicular ceramics. These simultaneous characteristics make the filters of the present invention useful in a wide variety of environments over an improved range of service temperatures.

While our invention has been described in terms of several specific embodiments, it must be appreciated that other embodiments could readily be adapted by one skilled in the art. Accordingly, the scope of our invention is to be limited only by the following claims.

What is claimed is:

1. A filter useful for separating at least one contaminant from a fluid passed through said filter, comprising:
   a porous support composed of a fused interlocked single crystal acicular ceramic material having properties sufficient to provide high mechanical strength, high impact strength, heat resistance and good resistance to thermal cycling; and
   a porous discriminating layer on at least part of said support.

2. The filter of claim 1, wherein said ceramic material is non-stoichiometric acicular mullite.

3. The filter of claim 2, wherein said non-stoichiometric acicular mullite is composed of about 76 percent by weight alumina and about 24 percent by weight silica.

4. The filter of claim 1, wherein said support is formed as a honeycomb extrusion of plural parallel channels.

5. The filter of claim 4, further comprising porous plugs of said ceramic material interlocked with said extrusion, disposed in single, alternating ends of said channels.

6. The filter of claim 1, wherein said support is formed as a disk having a face on which said discriminating layer is disposed.

7. The filter of claim 1, wherein said support is formed as a cylinder.

8. The filter of claim 7, Wherein said cylinder has a hollow interior and an external surface, and wherein said discriminating layer is disposed on said external surface of said cylinder.

9. The filter of claim 8, further comprising means permitting fluid passing through said discriminating layer and said cylinder to exit said interior of said cylinder.

10. The filter of claim 1, wherein said support includes an extrusion having a fluid inlet end and a porous end cap positioned over said fluid inlet end, said end cap being composed of said ceramic material interlocked with said extrusion.

11. The filter of claim 1, wherein said support includes an extrusion having a fluid outlet end and a porous end cap positioned over said fluid outlet end, said end cap being composed of said ceramic material interlocked with said extrusion.

12. The filter of claim 1, wherein said support has a theoretical density of about 15 to 50 percent.

13. The filter of claim 1, wherein the average pore size of said support is about 10 to about 25 micrometers.

14. The filter of claim 1, wherein said discriminating layer is a sintered ceramic layer, a layer of a polymeric organic compound, a molecular sieve, a gel filtration gel, or a microporous gaseous diffusion barrier.

15. The filter of claim 1, wherein said discriminating layer is a sintered alpha-alumina membrane.

16. The filter of claim 1, wherein said discriminating layer has a pore size between about 0.5 nanometers and about 50 micrometers.

17. The filter of claim 1, further comprising an external, fluid-impermeable glaze substantially covering said filter.

18. The filter of claim 17, wherein said glaze includes a mixture of glass frit and clay.

19. A filter useful for separating at least one contaminant from a fluid passed through said filter, comprising:
   a support including a porous honeycomb extrusion composed of a non-stoichiometric acicular mullite having properties sufficient to provide high mechanical strength, high impact strength, heat resistance and good resistance to thermal cycling, having a plurality of parallel channels and including a fluid inlet end and a fluid outlet end; a plurality of plugs disposed in single alternating ends of said parallel channels, said plugs also being made of non-stoichiometric acicular mullite and interlocked with said honeycomb extrusion; and end caps positioned over said fluid inlet and fluid outlet ends, said end caps also being made of non-stoichiometric acicular mullite and interlocked with said honeycomb extrusion; said extrusion, said plugs and one of said end caps including surfaces defining an inlet chamber in said filter;
   an external fluid-impermeable glaze covering said support; and
   a sintered porous alpha-alumina membrane on said inlet chamber-defining surfaces of said support, said membrane acting as a discriminating layer for filtering and separating.

20. A method of forming a filter useful for separating at least one contaminant from a fluid passed through said filter, comprising:
   forming a green support composed of a ceramic material capable of being converted in situ into fused, interlocked, single crystal, acicular ceramic particles;

converting said ceramic material in situ into fused, interlocked, single crystal, acicular ceramic particles, thereby forming a rigid and porous ceramic support having high mechanical strength, high impact strength, heat resistance and good resistance to thermal cycling; and applying a porous discriminating layer on at least part of said support.

21. The method of claim 20, wherein said ceramic material is a non-stoichiometric mullite yielding acicular mullite upon said converting step.

22. The method of claim 21, wherein said non-stoichiometric mullite is composed of about 76 percent by weight alumina and 24 percent by weight silica.

23. The method of claim 20, wherein said applying step is accomplished by coating at least one surface of said support with a slurry of alpha-alumina, and sintering said support and said alpha-alumina so as to form a thin, continuous membrane of porous alpha-alumina on said at least one surface of said support.

24. The method of claim 20, wherein said step of forming a support is accomplished by abutting together at least two support pieces, and wherein said pieces become interlocked with one another during said converting step.

25. The method of claim 24, wherein one of said at least two pieces includes a honeycomb extrusion of plural parallel channels.

26. The method of claim 25, wherein the other of said at least two pieces includes a plurality of porous plugs disposed in single alternating ends of said parallel channels.

27. The method of claim 25, wherein said extrusion includes at least one of a fluid inlet end and a fluid outlet end, and wherein the other of said at least two pieces includes an end cap over one of said inlet and outlet ends of said extrusion.

28. The method of claim 20, further comprising the step of firing a fluid-impermeable enamel glaze on said support, substantially covering said support, prior to applying said discriminating layer to said support.

29. The method of claim 20, wherein said ceramic material is a non-stoichiometric mullite composed of alumina and silica, and wherein said converting step is accomplished by heating said support at 500° to 950° C. in the presence of silicon tetrafluoride for a time sufficient to form fluorotopaz from said alumina and silica, and then heating said support at 1100° to 1150° C. for a time sufficient to transform said fluorotopaz into non-stoichiometric acicular mullite.

30. A method of forming a filter useful for separating at least one contaminant from a fluid passed through said filter, said filter including a porous ceramic support, and said method comprising:

abutting at least two support pieces together, said pieces each being composed of a ceramic material capable of being converted in situ into fused, interlocked, single crystal, acicular particles having properties sufficient to provide high mechanical strength, high impact strength, heat resistance and good resistance to thermal cycling; and converting said ceramic material in situ into fused, interlocked, single crystal, acicular particles;

whereby said two support pieces become unified and interlocked by said acicular particles.

31. The method of claim 30, wherein said ceramic material is a non-stoichiometric mullite, and said converting step is carried out so as to convert said pieces into non-stoichiometric acicular mullite.

32. The method of claim 31, wherein said non-stoichiometric mullite is composed of about 76 percent by weight alumina and 24 percent by weight silica.

33. The method of claim 30, wherein said at least two support pieces include an extrusion and end caps on the ends of said extrusion.

34. The method of claim 30, wherein said at least two support pieces include a honeycomb extrusion having channels defined therein, and plugs closing the ends of at least some of said channels.

35. The method of claim 34, wherein said plugs are composed of a paste or slurry of said ceramic material.

36. The method of claim 30, wherein said at least two pieces are abutted by joining said pieces with a paste or slurry including said ceramic material.

* * * * *